United States Patent [19]

Kawakami

[11] Patent Number: 4,524,108

[45] Date of Patent: Jun. 18, 1985

[54] MAGNETIC RECORDING MEDIUM

[75] Inventor: Yoshio Kawakami, Tohbu, Japan

[73] Assignee: TDK Corporation, Tokyo, Japan

[21] Appl. No.: 535,067

[22] Filed: Sep. 23, 1983

[30] Foreign Application Priority Data

Nov. 8, 1982 [JP] Japan ................... 57-194643

[51] Int. Cl.$^3$ ................... B32B 5/16; G11B 5/70
[52] U.S. Cl. ................... 428/480; 428/692; 428/900
[58] Field of Search ............... 428/480, 692, 689, 702, 428/900; 264/22; 430/937

[56] References Cited

U.S. PATENT DOCUMENTS 4,115,617 9/1978 Mitsuishi et al. ................... 428/480

FOREIGN PATENT DOCUMENTS 56-71831 6/1981 Japan ................... 428/900

Primary Examiner—Paul J. Thibodeau
Attorney, Agent, or Firm—Oblon, Fisher, Spivak, McClelland & Maier

[57] ABSTRACT

In a magnetic recording medium comprising a substrate and a magnetic layer formed thereon and composed of magnetic powder dispersed in a polymer binder, an improvement wherein said substrate is made of a polyethylene terephthalate having a refractive index of at least 1.499 in the direction of the thickness of the substrate.

1 Claim, No Drawings

MAGNETIC RECORDING MEDIUM

The present invention relates to a magnetic recording medium, particularly to a magnetic recording medium in the form of a film.

In a magnetic recording tape such as a sound recording tape or a video tape, it is common to use a polyester (particularly a polyethylene terephthalate) as a substrate and to form a magnetic layer on one surface of the substrate.

The properties of a magnetic recording tape are largely governed not only by the properties of the magnetic layer coated on the substrate but also by the properties of the substrate. Particularly, the adhesion between the substrate and the magnetic layer is important for the magnetic recording tape. If, for some reason, the adhesion becomes partially poor or peeling takes place even locally, the recording and reproduction characteristics will thereby be adversely affected or, in an extreme case, the recording and reproduction will become impossible, and the outer appearance tends to be poor. On the other hand, the surface smoothness of the substrate is another important property. The S/N ratio of the magnetic recording tape is greatly affected by the surface smoothness. With the development of high quality magnetic recording tapes, it has become common to use a smooth-surfaced substrate. However, when a smooth-surfaced substrate is used, the friction with a sliding contact surface such as a magnetic head increases, and accordingly the tension of the tape increases, thus giving rise to jitters. In order to prevent this to happen, a magnetic recording tape has been proposed wherein a non-magnetic coating (i.e. a back coating) is provided on the substrate surface opposite to the magnetic layer side.

As a result of extensive researches, the present inventors have found that when the polyethylene terephthalate substrate has a refractive index of at least 1.499 in the direction of the thickness of the substrate, the tension of the magnetic recording tape during its use tends to decrease, whereby it becomes unnecessary to provide a back coating layer even when a smooth-surfaced polyethylene terephthalate is employed. Further, it has been found that by application of corona discharge treatment, it is possible to improve the adhesion to such an extent that the substrate and the magnetic layer are hardly peeled from each other.

Polyethylene terephthalate films are widely used as substrates of magnetic recording tapes. However, such commercially available substrates have a refractive index of less than 1.495 in the direction of the thickness. By a special order, the present inventors have had polyethylene terephthalate films having a refractive index of at least 1.499 prepared on trial basis, and employed the films as substrates of magnetic recording media, whereby the desired effects have been obtained.

Thus, the present invention provides a magnetic recording medium comprising a substrate and a magnetic layer formed thereon and composed of magnetic powder dispersed in a polymer binder, wherein said substrate is made of a polyethylene terephthalate having a refractive index of at least 1.499 in the direction of the thickness of the substrate. It is preferred that the magnetic layer side surface of the polyethylene terephthalate substrate is a surface treated with corona discharge treatment.

Now, the present invention will be described in further detail with reference to Examples.

EXAMPLES 1 to 5

Corona discharge treatment was applied to each of various polyethylene terephthalate films having a thickness of 14.5 μm, and a magnetic layer having a thickness of 4.5 μm was applied to the treated surface and dried to obtain a magnetic recording tape.

The magnetic layer was formed by mixing 70% by weight of fine powder of Co-doped $\gamma$-$Fe_2O_3$ and 30% by weight of a binder composed of 5% by weight of urethane rubber, 3.5% by weight of nitrocellulose, 1.5% by weight of polyvinyl chloride and 90% by weight of methylethyl ketone, adding and mixing 15% by weight, based on the resin components, of a polyisocyanate (Desmodule manufactured by Bayer Co.), and applying the coating mixture thus obtained, onto the substrate surface and drying and hardening it.

As the substrates, polyethylene terephthalates having a refractive index of at least 1.499 in the direction of the thickness were used. The magentic recording tapes thus obtained were designated as Examples 1 to 5 based on the refractive indexes, as shown in Table 1. No corona discharge treatment was applied in the case of Example 3, and the corona discharge treatment was applied in all other cases.

The magnetic recording tapes thus obtained were tested for the adhesion and friction. The results thereby obtained are shown in Table 1.

COMPARATIVE EXAMPLES 1 to 5

For the purpose of the comparison, magnetic recording tapes were prepared in the same manner as in Examples 1 to 5 by using commercially available polyethylene terephthalates having a thickness of 14.5 μm as conventional substrates for magnetic recording tapes. All of the polyethylene terephthalates had a refractive index of less than 1.495 in the direction of the thickness.

The magnetic recording tapes thus obtained were tested for the adhesion and friction. The results thereby obtained are shown in Table 1.

In the Table, the refractive index in the direction of the thickness was measured at 25° C. by means of Abbe's Refractometer Model-4 (trade name) manufactured by Atago Co. $I_{110}/I_{100}$ was obtained by measuring the diffraction intensities in a [110] plane and a [100] plane by means of an X-ray diffraction apparatus manufactured by Rigaku Denki K. K. The density was measured at 25° C. by means of a handy-type specific gravity tester manufactured by Shibayama Kagaku Kiki Seisakusho. The roughness was measured by means of a needle-senser roughness tester manufactured by Kosaka Kenkyusho and represented by an average roughness Ra. For the determination of the adhesion, the magnetic layer surface of the magnetic recording tape and a paper board were bonded with a double-tack tape (a scotch double-tack tape type-665, trade name, manufactured by 3M), and a non-bonded portion of the magnetic recording tape was folded back at an angle of 180° and pulled in a direction parallel to the paper board surface at a rate of 1000 mm/min. to peel the magnetic layer, whereby the tension exerted to the paper board was evaluated as the adhesion (a peeling method). Further, another evaluation was conducted by a visual observation method in which the magnetic recording tape was crumpled with hands, whereby the adhesion of the coated layer was evaluated in accordance with the following ratings:
X: Substantially peeled
Δ: Slightly peeled
O: Non-peeling Further, for the determination of the frictional force, a VHS-type video cassette tape was assembled and subjected to a running test by means of video deck NV-8700 (trade name) manufactured by Matsushita Electric Industrial Co. Ltd., whereby the tension at the outlet of the rotary drum was measured, and the frictional force was represented by the ratio relative to Comparative Example 1. Furthermore, three stage video waves were recorded on the same magnetic recording tape, and the tape was left to stand at 55° C. in a relative humidity of 80% for 5 days, and then reproduced at a normal temperature, whereby the reproduced image was evaluated by naked eyes in accordance with the following ratings:
X: Substantial jitters
Δ: Small jitters
O: Good.

greater than 1.499 were used as substrates, the frictional force was low and excellent results were obtained also in the running tests (Examples 1 to 5). Among the Examples, in a case where no corona discharge treatment was conducted, the adhesion was substantially the same as in the conventional products (Example 3). Whereas, when the corona discharge was used in combination, the adhesion was found to be remarkably improved (Example 1, 2, 4 and 5). Such superior adhesion can not be obtained by mere application of corona discharge treatment (Comparative Examples 2, 4 and 5), and it is evident that such superior adhesion is obtainable only when the corona discharge treatment was applied to a substrate having a high refractive index in the direction of its thickness.

It is expected that the present invention is generally applicable also to polyester films.

I claim:

1. In a magnetic recording medium comprising a substrate and a magnetic layer formed thereon and composed of magnetic powder dispersed in a polymer binder, an improvement wherein said substrate is made of a polyethylene terephthalate having a refractive index of at least 1.499 in the direction of the thickness of the substrate, said substrate being treated on the side on which said magnetic layer is formed with corona discharge treatment.

TABLE 1

| | Properties of polyethylene terephthalate films | | | | Corona | Adhesion | | Friction | |
| | Refractive index in the direction of the thickness | $I_{100}/I_{100}$ | Density (g/cc) | Roughness (μm) | discharge quantity (w/m² min.) | 180° peeling method (g) | Visual observation method | Tension | Visual observation method |
|---|---|---|---|---|---|---|---|---|---|
| Comparative Example 1 | 1.4905 | 3.3 | 1.3930 | 0.020 | 0 | 9 | X | 1.00 | Δ |
| Comparative Example 2 | 1.4905 | 3.3 | 1.3930 | 0.020 | 10 | 29 | X~Δ | 1.00 | Δ |
| Comparative Example 3 | 1.4947 | 8.1 | 1.3935 | 0.027 | 0 | 11 | X | 0.95 | Δ |
| Comparative Example 4 | 1.4947 | 8.1 | 1.3935 | 0.027 | 10 | 40 | Δ | 0.95 | Δ |
| Comparative Example 5 | 1.4946 | 5.1 | 1.3917 | 0.016 | 10 | 34 | X~Δ | 1.18 | X |
| Example 1 | 1.4991 | 13.8 | 1.3933 | 0.043 | 10 | 66 | O | 0.90 | O |
| Example 2 | 1.5002 | 13.0 | 1.3930 | 0.026 | 10 | 58 | O | 0.88 | O |
| Example 3 | 1.5005 | 12.2 | 1.3943 | 0.026 | 0 | 14 | X | 0.86 | O |
| Example 4 | 1.5005 | 12.2 | 1.3943 | 0.026 | 5 | 58 | O | 0.87 | O |
| Example 5 | 1.5005 | 13.2 | 1.3947 | 0.014 | 10 | 52 | O | 0.87 | O |

It is evident from the Table that when the refractive index in the direction of the thickness of the polyethylene terephthalate film is less than 1.495, the friction is large (Comparative Examples 1 to 5). Whereas, in all cases of the magnetic recording tapes wherein polyethylene terephthalate films having a refractive index of

* * * * *